(12) United States Patent
Marissen et al.

(10) Patent No.: US 11,149,122 B2
(45) Date of Patent: *Oct. 19, 2021

(54) HIGH PERFORMANCE FIBRES COMPOSITE SHEET

(71) Applicant: DSM IP Assets B.V., Heerlen (NL)

(72) Inventors: Roelof Marissen, Echt (NL); Johannes Wilms, Echt (NL); Leonard Nielaba, Echt (NL)

(73) Assignee: DSM IP ASSETS B.V., Heerlen (NL)

( * ) Notice: Subject to any disclaimer, the term of this patent is extended or adjusted under 35 U.S.C. 154(b) by 573 days.

This patent is subject to a terminal disclaimer.

(21) Appl. No.: 15/765,548

(22) PCT Filed: Oct. 7, 2016

(86) PCT No.: PCT/EP2016/074066
§ 371 (c)(1),
(2) Date: Apr. 3, 2018

(87) PCT Pub. No.: WO2017/060469
PCT Pub. Date: Apr. 13, 2017

(65) Prior Publication Data
US 2018/0282497 A1    Oct. 4, 2018

(30) Foreign Application Priority Data
Oct. 9, 2015    (EP) .................................... 15189131

(51) Int. Cl.
*C08J 5/04*    (2006.01)
*D06M 15/227*    (2006.01)
(Continued)

(52) U.S. Cl.
CPC ............... *C08J 5/046* (2013.01); *C08L 23/06* (2013.01); *D06M 15/227* (2013.01);
(Continued)

(58) Field of Classification Search
USPC ......... 264/103, 205; 428/394; 442/181, 225, 442/370; 156/308.2, 285
See application file for complete search history.

(56) References Cited

U.S. PATENT DOCUMENTS

| 4,403,012 A | 9/1983 | Harpell et al. |
| 4,623,574 A | 11/1986 | Harpell et al. |

(Continued)

FOREIGN PATENT DOCUMENTS

| EP | 0 091 547 | 10/1983 |
| EP | 0 205 960 | 12/1986 |

(Continued)

OTHER PUBLICATIONS

International Search Report for PCT/EP2016/074066, dated Jan. 4, 2017, 4 pages.

(Continued)

*Primary Examiner* — Lynda Salvatore
(74) *Attorney, Agent, or Firm* — Nixon & Vanderhye P.C.

(57) ABSTRACT

The invention relates to a method for manufacturing a composite sheet comprising high performance polyethylene fibres and a polymeric resin comprising the steps of assembling HPPE fibres to a sheet, applying an aqueous suspension of a polymeric resin to the HPPE fibres, partially drying the aqueous suspension, optionally applying a temperature and/or a pressure treatment to the composite sheet wherein the polymeric resin is a homopolymer or copolymer of ethylene and/or propylene. The invention further relates to composite sheets obtainable by said method and articles comprising the composite sheet such as helmets, radomes or a tarpaulins.

13 Claims, 1 Drawing Sheet

Figure 1A:
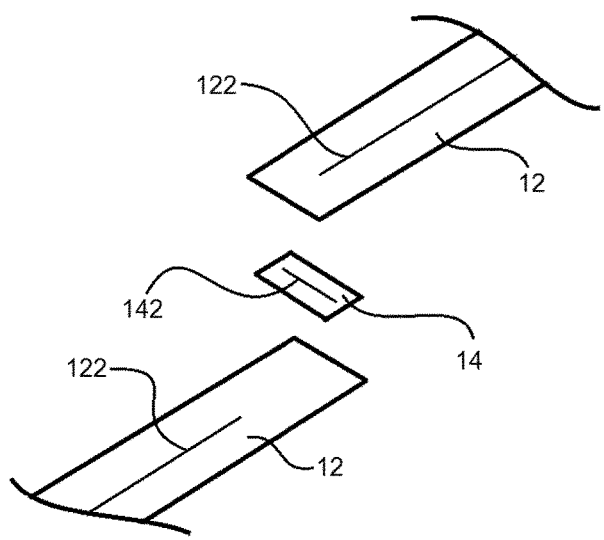

(51) Int. Cl.
*F41H 5/04* (2006.01)
*D06P 3/79* (2006.01)
*D06M 15/263* (2006.01)
*D06P 1/52* (2006.01)
*D06P 1/44* (2006.01)
*C08L 23/06* (2006.01)
*D06M 101/20* (2006.01)

(52) U.S. Cl.
CPC ............ D06M 15/263 (2013.01); D06P 1/44 (2013.01); D06P 1/525 (2013.01); D06P 1/5221 (2013.01); D06P 3/79 (2013.01); F41H 5/0471 (2013.01); F41H 5/0485 (2013.01); *C08J 2323/04* (2013.01); *C08J 2323/10* (2013.01); *D06M 2101/20* (2013.01)

(56) References Cited

U.S. PATENT DOCUMENTS

| | | |
|---|---|---|
| 5,091,133 A | 2/1992 | Kobayashi et al. |
| 5,766,725 A | 6/1998 | Hogenboom et al. |
| 7,211,291 B2 | 5/2007 | Harpell et al. |
| 8,999,866 B2 | 4/2015 | Simmelink et al. |
| 2019/0040556 A1* | 2/2019 | Marissen ............... A01K 91/00 |

FOREIGN PATENT DOCUMENTS

| | | |
|---|---|---|
| EP | 0 551 837 | 7/1993 |
| EP | 1 627 719 | 2/2006 |
| EP | 2 488 364 | 2/2015 |
| GB | 2 042 414 | 9/1980 |
| GB | 2 051 667 | 1/1981 |
| WO | WO 2001/073173 | 10/2001 |
| WO | WO 2008/128708 | 10/2008 |
| WO | WO 2011/045321 | 4/2011 |
| WO | WO 2013/131996 | 9/2013 |
| WO | WO 2013131996 * | 9/2013 ............... B32B 5/02 |

OTHER PUBLICATIONS

Written Opinion of the ISA for PCT/EP2016/074066, dated Jan. 4, 2017, 7 pages.

* cited by examiner

HIGH PERFORMANCE FIBRES COMPOSITE SHEET

This application is the U.S. national phase of International Application No. PCT/EP2016/074066 filed Oct. 7, 2016, which designated the U.S. and claims priority to EP Patent Application No. 15189131.4 filed Oct. 9, 2015, the entire contents of each of which are hereby incorporated by reference.

The present invention concerns a method for producing a composite sheet comprising high performance polyethylene fibres and a polymeric resin and such composite sheet. These composite sheets are amongst others especially adapted to facilitate the manufacture of ballistic resistant articles, amongst which soft ballistic articles for example for vests and moulded ballistic articles for example for vehicle protection, combat helmets, or inserts.

Composite materials comprising high performance polyethylene fibres and a polymeric resin as a matrix material are known from U.S. Pat. Nos. 4,623,574, 5,766,725, 7,211,291 and 8,999,866. U.S. Pat. No. 4,623,574 discloses the manufacture of ballistic resistant sheets by cross plying and stacking a plurality of monolayers comprising unidirectionally aligned extended chain polyethylene fibers and a matrix material, followed by pressing the cross-plied and stacked monolayers into a sheet. Example 1 of U.S. Pat. No. 4,623,574 mentions the production of unidirectional monolayers by helically wrapping polyethylene fibers side-by-side on a drum winder whereby a Kraton D1107 solution is used to coat the unidirectionally aligned fibers. A plurality of the thus obtained unidirectional monolayers was stacked whereby the fiber direction in a monolayer is perpendicular to the fiber direction in an adjacent monolayer. The obtained stack was pressed, followed by cooling to provide a molded ballistic article.

There is continuous drive towards improved ballistic resistant articles and the present inventors have surprisingly found a method to produce ballistic resistant sheet that enables the manufacture of soft ballistic sheets or ballistic resistant moulded articles with improved ballistic resistance properties. Such improved ballistic resistance properties may for example be expressed in a reduction of the delamination of composite materials upon use, resulting in increased protection by the ballistic resistant products. Preferably the ballistic protection may relate to the bullet stopping characteristics, the reduction of trauma or back face deformation or a reduction of material deterioration by delamination upon use.

It is the aim of the present invention to provide a manufacturing process and the thereby obtainable composite material that at least partly overcome the above mentioned problems.

The present invention solves this need by applying an aqueous suspension comprising polymeric resin to the high performance polyethylene (HPPE) fibres before, during or after the step of assembling said HPPE fibres to an assembly, at least partially drying the aqueous suspension of the polymeric resin applied to the HPPE fibres to obtain a composite sheet, optionally applying a temperature in the range from the melting temperature of the resin to 153° C. to the assembly before, during and/or after at least partially drying the suspension to at least partially melt the polymeric resin and optionally applying a pressure to the at least partially dried composite sheet before, during and/or after the temperature treatment to at least partially compact the composite sheet, wherein the polymeric resin is a homopolymer or copolymer of ethylene and/or propylene and wherein said polymeric resin has a density as measured according to ISO1183 in the range from 860 to 930 kg/m$^3$, a peak melting temperature in the range from 40 to 140° C. and a heat of fusion of at least 5 J/g.

It has unexpectedly been found that the composite sheet manufactured according to the method of the present invention may show an improved delamination behaviour. Said improvement was demonstrated for both soft ballistic and moulded ballistic articles by an increased peel strength of the composite sheet and a reduced back face deformation of moulded articles comprising a stack of the composite sheets respectively.

By fibre is herein understood an elongated body, the length dimension of which is much greater than the transverse dimensions of width and thickness. Accordingly, the term fiber includes filament, ribbon, strip, band, tape, and the like having regular or irregular cross-sections. The fiber may have continuous lengths, known in the art as filament or continuous filament, or discontinuous lengths, known in the art as staple fibers. A yarn for the purpose of the invention is an elongated body containing many individual fibers. By individual fiber is herein understood the fiber as such. Preferably the HPPE fibres of the present invention are HPPE tapes, HPPE filaments or HPPE staple fibres.

In the context of the present invention HPPE fibres are understood to be polyethylene fibres with improved mechanical properties such as tensile strength, abrasion resistance, cut resistance or the like. In a preferred embodiment high performance polyethylene fibres are polyethylene fibres with a tensile strength of at least 1.0 N/tex, more preferably at least 1.5 N/tex, more preferably at least 1.8 N/tex, even more preferably at least 2.5 N/tex and most preferably at least 3.5 N/tex. Preferred polyethylene is high molecular weight (HMWPE) or ultrahigh molecular weight polyethylene (UHMWPE). Best results were obtained when the high performance polyethylene fibers comprise ultra-high molecular weight polyethylene (UHMWPE) and have a tenacity of at least 2.0 N/tex, more preferably at least 3.0 N/tex.

Preferably the composite sheet of the present invention comprises HPPE fibres comprising high molecular weight polyethylene (HMWPE) or ultra-high molecular weight polyethylene (UHMWPE) or a combination thereof, preferably the HPPE fibres substantially consist of HMWPE and/or UHMWPE. The inventors observed that for HMWPE and UHMWPE the best ballistic performances could be achieved.

In the context of the present invention the expression 'substantially consisting of' has the meaning of 'may comprise a minor amount of further species' wherein minor is up to 5 wt %, preferably of up to 2 wt % of said further species or in other words 'comprising more than 95 wt % of' preferably 'comprising more than 98 wt % of' HMWPE and/or UHMWPE.

In the context of the present invention the polyethylene (PE) may be linear or branched, whereby linear polyethylene is preferred. Linear polyethylene is herein understood to mean polyethylene with less than 1 side chain per 100 carbon atoms, and preferably with less than 1 side chain per 300 carbon atoms; a side chain or branch generally containing at least 10 carbon atoms. Side chains may suitably be measured by FTIR. The linear polyethylene may further contain up to 5 mol % of one or more other alkenes that are copolymerisable therewith, such as propene, 1-butene, 1-pentene, 4-methylpentene, 1-hexene and/or 1-octene.

The PE is preferably of high molecular weight with an intrinsic viscosity (IV) of at least 2 dl/g; more preferably of at least 4 dl/g, most preferably of at least 8 dl/g. Such polyethylene with IV exceeding 4 dl/g are also referred to as ultra-high molecular weight polyethylene (UHMWPE). Intrinsic viscosity is a measure for molecular weight that can more easily be determined than actual molar mass parameters like number and weigh average molecular weights (Mn and Mw).

The HPPE fibres used in the method according to the invention may be obtained by various processes, for example by a melt spinning process, a gel spinning process or a solid state powder compaction process.

One preferred method for the production of the fibres is a solid state powder process comprising the feeding the polyethylene as a powder between a combination of endless belts, compression-molding the polymeric powder at a temperature below the melting point thereof and rolling the resultant compression-molded polymer followed by solid state drawing. Such a method is for instance described in U.S. Pat. No. 5,091,133, which is incorporated herein by reference. If desired, prior to feeding and compression-molding the polymer powder, the polymer powder may be mixed with a suitable liquid compound having a boiling point higher than the melting point of said polymer. Compression molding may also be carried out by temporarily retaining the polymer powder between the endless belts while conveying them. This may for instance be done by providing pressing platens and/or rollers in connection with the endless belts.

Another preferred method for the production of the fibres used in the invention comprises feeding the polyethylene to an extruder, extruding a molded article at a temperature above the melting point thereof and drawing the extruded fibres below its melting temperature. If desired, prior to feeding the polymer to the extruder, the polymer may be mixed with a suitable liquid compound, for instance to form a gel, such as is preferably the case when using ultra high molecular weight polyethylene.

In yet another method the fibres used in the invention are prepared by a gel spinning process. A suitable gel spinning process is described in for example GB-A-2042414, GB-A-2051667, EP 0205960 A and WO 01/73173 A1. In short, the gel spinning process comprises preparing a solution of a polyethylene of high intrinsic viscosity, extruding the solution into a solution-fibre at a temperature above the dissolving temperature, cooling down the solution-fibre below the gelling temperature, thereby at least partly gelling the polyethylene of the fibre, and drawing the fibre before, during and/or after at least partial removal of the solvent.

In the described methods to prepare HPPE fibres drawing, preferably uniaxial drawing, of the produced fibres may be carried out by means known in the art. Such means comprise extrusion stretching and tensile stretching on suitable drawing units. To attain increased mechanical tensile strength and stiffness, drawing may be carried out in multiple steps.

In case of the preferred UHMWPE fibres, drawing is typically carried out uniaxially in a number of drawing steps. The first drawing step may for instance comprise drawing to a stretch factor (also called draw ratio) of at least 1.5, preferably at least 3.0. Multiple drawing may typically result in a stretch factor of up to 9 for drawing temperatures up to 120° C., a stretch factor of up to 25 for drawing temperatures up to 140° C., and a stretch factor of 50 or above for drawing temperatures up to and above 150° C. By multiple drawing at increasing temperatures, stretch factors of about 50 and more may be reached. This results in HPPE fibres, whereby for ultrahigh molecular weight polyethylene, tensile strengths of 1.5 N/tex to 3 N/tex and more may be obtained.

In one process step of the present invention an aqueous suspension is applied to the HPPE fibres. Such application of suspension takes place before, during or after the fibres are assembled into a sheet. By aqueous suspension is understood that particles of the polymeric resin are suspended in water acting as non-solvent. The concentration of the polymeric resin may widely vary and is mainly limited by the capability to formulate a stable suspension of the resin in water. A typical range of concentration is between 2 and 80 wt % of polymeric resin in water, whereby the weight percentage is the weight of polymeric resin in the total weight of aqueous suspension. Preferred concentration are between 4 and 60 wt %, more preferably between 5 and 50 wt %, most preferably between 6 and 40 wt %. Further preferred concentrations of the polymeric resin in the dispersion is at least 15 wt %, preferably at least 18 wt % and even more preferably at least 20 wt %. In another preferred embodiment the concentration of the polymeric resin in the aqueous dispersion is between 10 and 50 wt %, preferably between 15 and 40 wt %, most preferably between 18 wt % and 30 wt %. Such preferred higher concentrations of polymeric resin may have the advantage of a providing lengthy body with higher concentration while reducing the time and energy required for the removal of the water from the lengthy body. The suspension may further comprise additives such as ionic or non-ionic surfactants, tackyfying resins, stabilizers, anti-oxidants, colorants or other additives modifying the properties of the suspension, the resin and or the prepared composite sheet. Preferably the suspension is substantially free of additives that may act as solvents for the polymeric resin. Such suspension may also be referred to as solvent-free. By solvent is herein understood a liquid in which at room temperature the polymeric resin is soluble in an amount of more than 1 wt % whereas a non-solvent is understood a liquid in which at room temperature the polymeric resin is soluble in an amount of less than 0.1 wt %.

The polymeric resin present in the applied aqueous suspension and ultimately present in the obtained composite sheet of the present invention is a homopolymer or copolymer of ethylene and/or propylene, also referred to as polyethylene, polypropylene or copolymers thereof, in the context of the present invention also referred to as polyolefin resin. It may comprise the various forms of polyethylene, ethylene-propylene co-polymers, other ethylene copolymers with co-monomers such as 1-butene, isobutylene, as well as with hetero atom containing monomers such as acrylic acid, methacrylic acid, vinyl acetate, maleic anhydride, ethyl acrylate, methyl acrylate; generally α-olefin and cyclic olefin homopolymers and copolymers, or blends thereof. Preferably the polymeric resin is a copolymer of ethylene or propylene which may contain as co-monomers one or more olefins having 2 to 12 C-atoms, in particular ethylene, propylene, isobutene, 1-butene, 1-hexene, 4-methyl-1-pentene, 1-octene, acrylic acid, methacrylic acid and vinyl acetate. In the absence of co-monomer in the polymeric resin, a wide variety of polyethylene or polypropylene may be used amongst which linear low density polyethylene (LLDPE), very low density polyethylene (VLDPE), low density polyethylene (LDPE), isotactic polypropylene, atactic polypropylene, syndiotactic polypropylene or blends thereof.

Furthermore, the polymeric resin may be a functionalized polyethylene or polypropylene or copolymers thereof or alternatively the polymeric resin may comprise a functionalized polymer. Such functionalized polymers are often referred to as functional copolymers or grafted polymers, whereby the grafting refers to the chemical modification of the polymer backbone mainly with ethylenically unsaturated monomers comprising heteroatoms and whereas functional copolymers refer to the copolymerization of ethylene or propylene with ethylenically unsaturated monomers. Preferably the ethylenically unsaturated monomer comprises oxygen and/or nitrogen atoms. Most preferably the ethylenically unsaturated monomer comprises a carboxylic acid group or derivatives thereof resulting in an acylated polymer, specifically in an acetylated polyethylene or polypropylene. Preferably, the carboxylic reactants are selected from the group consisting of acrylic, methacrylic, cinnamic, crotonic, and maleic, fumaric, and itaconic reactants. Said functionalized polymers typically comprise between 1 and 10 wt % of carboxylic reactant or more. The presence of such functionalization in the resin may substantially enhance the dispersability of the resin and/or allow a reduction of further additives present for that purpose such as surfactants.

The polymeric resin has a density as measured according to ISO1183 in the range from 860 to 930 kg/m$^3$, preferably from 870 to 920 kg/m$^3$, more preferably from 875 to 910 kg/m$^3$. The inventors identified that polyolefin resins with densities within said preferred ranges provide an improved balance between the mechanical properties of the composite article and the processability of the suspension, especially the dried suspension during the process of the invention.

The polymeric resin is a semi-crystalline polyolefin having a peak melting temperature in the range from 40 to 140° C. and a heat of fusion of at least 5 J/g, measured in accordance with ASTM E793 and ASTM E794, considering the second heating curve at a heating rate of 10 K/min, on a dry sample. In a preferred embodiment of the present invention the polymeric resin has a heat of fusion of at least 10 J/g, preferably at least 15 J/g, more preferably at least 20 J/g, even more preferably at least 30 J/g and most preferably at least 50 J/g. The inventors surprisingly found that with the increase heat of fusion the composite sheet showed further improved ballistic performance such as back face deformation and peel strength. The heat of fusion of the polymeric resin is not specifically limited by an upper value, other than the theoretical maximum heat of fusion for a fully crystalline polyethylene or polypropylene of about 300 J/g. The polymeric resin is a semi-crystalline product with a peak melting temperature in the specified ranges. Accordingly is a reasonable upper limit for the polymeric resin a heat of fusion of at most 200 J/g, preferably at most 150 J/g. In another preferred embodiment, a peak melting temperature of the polymeric resin is in the range from 50 to 130° C., preferably in the range from 60 to 120° C. Such preferred peak melting temperatures provide a more robust processing method to produce the composite sheets in that the conditions for drying and/or compaction of the composite sheet do need less attention while composites with good properties are produced. The polymeric resin may have more than one peak melting temperatures. In such case at least one of said melting temperatures falls within the above ranges. A second and/or further peak melting temperature of the polymeric resin may fall within or outside the temperature ranges. Such may for example be the case when the polymeric resin is a blend of polymers.

The polymeric resin may have a modulus that may vary in wide ranges. A low modulus resin with for example a modulus of about 50 MPa, will provide very flexible and thus comfortable armour for example for application in bullet resistant vests. A high modulus resin with for example a modulus of about 500 MPa may provide armours with some structural performance, e.g. a good ear to ear compression resistance for combat helmets. Each application may have an optimum modulus for the resin, related to the specific demands during the use of the application.

The application of the suspension to the HPPE fibres may be done by methods known in the art and may depend amongst others on the moment the suspension is added to the fibres, the nature of the sheet, the concentration and viscosity of the suspension. The suspension may for example be applied to the fibres by spraying, dipping, brushing, transfer rolling or the like, especially depending on the intended amount of polymeric resin present in the composite article of the invention. The amount of suspension present in the sheet may vary widely in function of the intended application of the composite sheet and can be adjusted by the employed method but also the properties of the suspension. For some applications, low amounts of highly concentrated suspensions are employed to reduce the energy and time need for drying the impregnated sheet. For other applications a low concentration suspension may be advantageous for example to increase the wetting and impregnation speed with low viscous suspensions. Last but not least the suspension concentration and quantity should be chosen to provide a composite sheet with the required amounts of polymeric resin present as a matrix material in said composite sheet. In a preferred embodiment said concentration of polymeric resin is at most 25 wt %, preferably at most 20 wt %, even more preferably at most 18 wt % and most preferably at most 16 wt %. In another preferred embodiment the concentration of the polymeric resin is between 1 and 25 wt %, preferably between 2 and 20 wt %, most preferably between 4 and 18 wt %, whereby the weight percentage is the weight of polymeric resin in the total weight of the composite sheet. In a further preferred embodiment the concentration of polymeric resin is at least 15 wt %, preferably at least 18 wt % and even more preferably at least 20 wt %. In another preferred embodiment the concentration of the polymeric resin is between 10 and 50 wt %, preferably between 15 and 40 wt %, most preferably between 18 wt % and 30 wt %, Such preferred higher concentrations of polymeric resin may have the advantage of a providing composite sheets with higher concentration while reducing the time and energy required for the removal of the water from the composite sheets.

Once the polymeric aqueous suspension is applied to the HPPE fibres, the impregnated fibre, preferably the assembly comprising the impregnated fibres, is at least partially dried. Such drying step involves the removal, e.g. the evaporation of at least a fraction of the water present in the assembly. Preferably the majority, more preferably essentially all water is removed during the drying step, optionally in combination with other components present in the impregnated assembled sheet. Drying, i.e. the removal of water from the suspension, may be done by methods known in the art. Typically the evaporation of water involves an increase of the temperatures of the sheet close to or above the boiling point of water. The temperature increase may be assisted or substituted by a reduction of the pressure and or combined with a continuous refreshment of the surrounding atmosphere. Typical drying conditions are temperatures of between 40 and 130° C., preferably 50 and 120° C. Typical pressure during the drying process are between 10 and 110 kPa, preferably between 20 and 100 kPa.

The process of the invention may optionally comprise a step wherein the composite sheet is heated to a temperature in the range from the melting temperature of the polymeric resin to 153° C., before, during and/or after the partially drying of the sheet. Heating of the sheet may be carried out by keeping the sheet for a dwell time in an oven set at a heating temperature, subjecting the impregnated sheet to heat radiation or contacting the layer with a heating medium such as a heating fluid, a heated gas stream or a heated surface. Preferably, the temperature is at least 2° C., preferably at least 5° C., most preferably at least 10° C. above the peak melting temperature of the polymeric resin. The upper temperature is at most 153° C., preferably at most 150° C., more preferably at most 145° C. and most preferably at most 140° C. The dwell time is preferably between 2 and 100 seconds, more preferably between 3 and 60 seconds, most preferably between 4 and 30 seconds. In a preferred embodiment, the heating of the sheet of this step overlaps, more preferably is combined with the drying step. It may prove to be practical to apply a temperature gradient to the impregnated sheet whereby the temperature is raised from about room temperature to the maximum temperature of the heating step over a period of time whereby the impregnated sheet will undergo a continuous process from drying of the suspension to at least partial melting of the polymeric resin.

In a further optional step of the process of the invention, the composite sheet is at least partially compacted by applying a pressure. Said pressure may be applied by compression means known in the art, which may amongst others be a calender, a smoothing unit, a double belt press, or an alternating press. The compression means form a gap through which the layer will be processed. Pressure for compaction generally ranges from 100 kPa to 10 MPa, preferably from 110 to 500 kPa. The compression is preferably performed after at least partially drying the composite sheet, more preferably during or after the optional step of applying a temperature, while the temperature of the sheet is in the range from the melting temperature of the polymeric resin to 153° C.

In a specific embodiment of the invention, a compression of the composite sheet may be achieved by placing the impregnated sheet during or after the impregnation step or the partial drying step under tension on a curved surface. The tension on that curved surface creates pressure between the fibers and surface. Filament winding is a well-known production process for composites where this effect occurs, and it can advantageously be applied in conjunction with the present invention.

The invention also relates to the composite sheet produced according to the inventive process. Such composite comprises assembled HPPE fibres and a polymeric resin, wherein the polymeric resin is a homopolymer or copolymer of ethylene and/or propylene, wherein the polymeric resin has a density as measured according to ISO1183 in the range from 860 to 930 kg/m$^3$, a melting temperature in the range from 40 to 140° C. and a heat of fusion of at least 5 J/g. Such composite sheet is subject to the preferred embodiments and potential advantages as discussed above or below in respect of the present inventive method, whereas the preferred embodiments for the composite potentially apply vice versa for the inventive method.

Preferably, the composite sheet comprises at least one network of the fibres. By network is meant that the fibres are arranged in configurations of various types, e.g. a knitted or woven fabric, a non-woven fabric with a random or ordered orientation of the fibres, a parallel array arrangement also known as unidirectional UD arrangement, layered or formed into a fabric by any of a variety of conventional techniques. Preferably, said sheets comprise at least one network of said fibres. More preferably, said sheets comprise a plurality of networks of the fibres. Such networks can be comprised in cut resistant garments, e.g. gloves and also in anti-ballistic products, e.g. ballistic resistant articles, vests, helmets, radomes and tarpaulin. Therefore, the invention also relates to such articles.

A preferred embodiment of the present invention concerns a composite sheet containing more than 75 wt % of UHMWPE, preferably more than 80 wt % of UHMWPE and most preferably more than 85 wt % UHMWPE, whereby the wt % are expressed as mass of UHMWPE to the total mass of the composite sheet. In a yet preferred embodiment, the UHMWPE present in the composite sheet is comprised in the HPPE fibres of said composite sheet.

In a preferred embodiment, the composite sheet contains at least one mono-layer made according to the inventive process. The term mono-layer refers to a layer of fibres. In a further preferred embodiment, the mono-layer is a unidirectional mono-layer. The term unidirectional mono-layer refers to a layer of unidirectionally oriented fibres, i.e. fibres that are essentially oriented in parallel. In a yet further preferred embodiment, the composite sheet is multi-layered composite sheet, containing a plurality of unidirectional mono-layers the direction of the fibres in each mono-layer preferably being rotated with a certain angle with respect to the direction of the fibres in an adjacent mono-layer. Preferably, the angle is at least 30°, more preferably at least 45°, even more preferably at least 75°, most preferably the angle is about 90°. Multi-layered composite articles proved very useful in ballistic applications, e.g. body armor, helmets, hard and flexible shield panels, panels for vehicle armouring and the like. Therefore, the invention also relates to ballistic-resistant articles as the ones enumerated hereinabove containing the inventive composite sheets. Preferably the sheet formed by aggregation of HPPE fibers is selected from the list consisting of a woven fabric, a non-woven fabric, a knitted fabric, a layer of unidirectional oriented fibres, a cross-ply of unidirectional oriented fibres or combination thereof.

Another embodiment of the invention relates to a composite sheet, which may be used as a ballistic resistant sheet, comprising at least one, preferably at least 2, monolayers comprised of unidirectionally (UD) oriented fibers and the polymeric resin. Preferably the fiber direction in each monolayer being rotated with respect to the fiber direction in an adjacent monolayer. Several monolayers may be preassembled before their use as ballistic resistant sheet. For that purpose a set of 2, 4, 6, 8 or 10 monolayers may be stacked such that the fiber direction in each monolayer is rotated with respect to the fiber direction in an adjacent monolayer, followed by consolidation. Consolidation may be done by the use of pressure and temperature to form a preassembled sheet, or sub-sheet. Pressure for consolidation generally ranges from 1-100 bar while temperature during consolidation typically is in the range from 60 to 140° C.

The composite sheet may furthermore comprise a so-called separating film, or cover sheet, being a polymeric film with a thickness of preferably from 1 to 20 micrometer, more preferably from 2 to 10 micrometer. The separating film may comprise polyethylene, especially ultra high molecular weight polyethylene, low density polyethylene, polypropylene, thermoplastic polyester or polycarbonate. Most preferably, biaxially-oriented films made from polyethylene, polypropylene, polyethylene terephthalate or polycarbonate are used as separating films. Preferably separating films are employed in combination with low modulus resins for composite sheets in soft ballistic applications.

In a preferred embodiment, the weight, or areal density, of the composite sheet comprising at least one UD monolayer, including the weight of the fibers and matrix material is typically at least 25 g/m², sometimes from 30 to 300 g/m², such as from 30 to 280 g/m². According to some embodiments, the weight or areal density of the monolayer is from 40 to 150 g/m².

The composite sheet of the invention is very suitable for use in soft ballistic articles, such as bullet-resistant vests. An alternative use of the composite sheet of the invention is in compressed or moulded ballistic resistant articles such as panels and especially curved panels and articles, e.g. inserts, helmets, radomes.

The application of an aqueous polymeric suspension whereby the polymeric resin present in said suspension is according to above described embodiments is providing products with improved properties. The use of an aqueous suspension of a polymeric resin as a binder material for HPPE fibres wherein the polymeric resin is a homopolymer or copolymer of ethylene and/or propylene, wherein the polymeric resin has a density as measured according to ISO1183 in the range from 860 to 930 kg/m³, a peak melting temperature in the range from 40 to 140° C. and a heat of fusion of at least 5 J/g is hence a further embodiment of the present invention.

It is important that the polyolefin resin of the suspension softens or melts at higher temperatures. So far such suspensions have not yet been applied in combination with HPPE fibres. Surprisingly, they provide improved performance in various products especially products comprising oriented UHMWPE fibres.

The combination of an oriented HPPE fibre with polyolefin polymers is described in EP2488364 where melting of the polyolefin polymer is employed to provide a flexible but strong sheets. However such products contain substantial amounts of polyolefin resin or provide an inadequate wetting/distribution of the resin throughout the HPPE structure. Products such as described in EP2488364 are substantially different from the ones prepared according to the method according to the present invention, amongst others because in the currently presented methods and products the distribution of the polymeric resin is throughout the sheets providing improved mechanical properties. Furthermore the impregnation of the HPPE fibre structure takes place at substantially lower temperatures and in the absence of hydrocarbon solvents which may avoid alterations of the HPPE fibres and/or their surfaces. After impregnation, the water is removed and the remainder of the suspension is present in a lower amount. The suspension may contain at least one surface active ingredient such as ionic or non-ionic surfactant.

Sheets comprising HPPE fibres coated with a polymer having ethylene or propylene crystallinity are also described in EP0091547, whereby mono- or multifilament fibers are treated at high temperatures with solutions of the polymer in hydrocarbon solvents at a concentration of up to 12 g/L. However, through such hot solvent treatment, the fibers may contain residual amounts of the employed hydrocarbon solvent negatively affecting fiber properties. Furthermore the treatment of the HPPE fiber at high temperature with a hydrocarbon solvent may affect structural properties of the fibers, especially through diffusion of the hydrocarbon solvent and/or polymer into the HPPE filaments. The fiber-polymer interface may be modified by partial etching and dissolution of the HPPE which may affected amongst others the interface as well as the bulk properties of the HPPE fibers. In contrast, the present process may be performed at room temperature and employs a non-solvent for the HPPE, i.e. water. Accordingly the fibers and composite sheets produced by the process of the present invention may have a better retention of the structural properties of the HPPE fibers. The fibers may also present a different surface structure amongst which a better discerned HPPE-coating interfaces compared to the fibers treated at high temperature with a hydrocarbon solvent since no hydrocarbon solvent and/or polymer may diffuse into the HPPE fiber. Furthermore the process and products described in EP0091547 are limited by the amount of polymer present in the hydrocarbon solutions and hence applied to the HPPE fibers. The solutions are limited by their increasing viscosities and high amounts of polymer coating may only be applied by repetition of the coating operation.

A preferred field of application of the composite sheet of the invention is in the field of anti-ballistic articles such as armours. The function of an armour is two-fold, it should stop fast projectiles, and it should do so with a minimum deformation or size of the impact dent. It was surprisingly observed that the size of the impact dent is small, if composite sheets made according to the present invention are used in armour. In other words, the back face signature is small. Such armour is especially suitable for combat helmet shells, because they show reduced back face signature on stopping projectiles, thus reducing trauma on the human skull and brain after being hit by a stopped projectile.

The invention will be further explained by the following examples and comparative experiment, however first the methods used in determining the various parameters useful in defining the present invention are hereinafter presented.

Methods

Dtex: yarn's or filament's titer was measured by weighing 100 meters of yarn or filament, respectively. The dtex of the yarn or filament was calculated by dividing the weight (expressed in milligrams) to 10;

Heat of fusion and peak melting temperature have been measured according to standard DSC methods ASTM E 794 and ASTM E 793 respectively at a heating rate of 10K/min for the second heating curve and performed under nitrogen on a dehydrated sample.

The density of the polymeric resin is measured according to ISO 1183.

IV: the Intrinsic Viscosity is determined according to method ASTM D1601(2004) at 135° C. in decalin, the dissolution time being 16 hours, with BHT (Butylated Hydroxy Toluene) as anti-oxidant in an amount of 2 g/l solution, by extrapolating the viscosity as measured at different concentrations to zero concentration.

Tensile properties of HPPE fibers: tensile strength (or strength) and tensile modulus (or modulus) are defined and determined on multifilament yarns as specified in ASTM D885M, using a nominal gauge length of the fibre of 500 mm, a crosshead speed of 50%/min and Instron 2714 clamps, of type "Fibre Grip D5618C". On the basis of the measured stress-strain curve the modulus is determined as the gradient between 0.3 and 1% strain. For calculation of the modulus and strength, the tensile forces measured are divided by the titre, as determined above; values in GPa are calculated assuming a density of 0.97 g/cm³ for the HPPE.

Tensile properties of fibers having a tape-like shape: tensile strength, tensile modulus and elongation at break are defined and determined at 25° C. on tapes of a width of 2 mm as specified in ASTM D882, using a nominal gauge length of the tape of 440 mm, a crosshead speed of 50 mm/min.

Tensile strength and tensile modulus at break of the polyolefin resin were measured according ISO 527-2.

Number of olefinic branches per thousand carbon atoms was determined by FTIR on a 2 mm thick compression moulded film by quantifying the absorption at 1375 cm-1 using a calibration curve based on NMR measurements as in e.g. EP 0 269 151 (in particular pg. 4 thereof).

Areal density (AD) of a panel or sheet was determined by measuring the weight of a sample of preferably 0.4 m×0.4 m with an error of 0.1 g. The areal density of a tape was determined by measuring the weight of a sample of preferably 1.0 m×0.1 m with an error of 0.1 g.

Materials

Suspension 1 was purchased from Dow Chemical company under the trade name HYPOD1000 and is a 56 wt % polyolefin aqueous suspension with melting peaks at 51° C. and 139° C. and a heat of fusion of 28 J/g.

Suspension 2 was purchased from Michelman under the trade name of Michem® Prime 5931 and is a 28 wt % suspension of an acrylate modified polyolefin (with a melting peak at 78° C. and a heat of fusion of 29 J/g) in water.

Suspension 3 was produced by extruding a mixture a plastomer (Queo 0210, commercially available from Borealis, with a density of 0.902 g/cm$^3$, a peak melting point of 95° C. and a heat of fusion of 120 J/g) and a surfactant (Synperonic® F 108 purchased from SIGMA-ALDRICH) in a weight ratio of 7 to 3 at 100° C. under addition of water. The resin content in the suspension was determined to be 40 wt %.

Suspension 4 was a commercially available polyurethane suspension in water.

EXAMPLES 1 TO 3 AND COMPARATIVE EXPERIMENTS A AND B

Figure 1B:
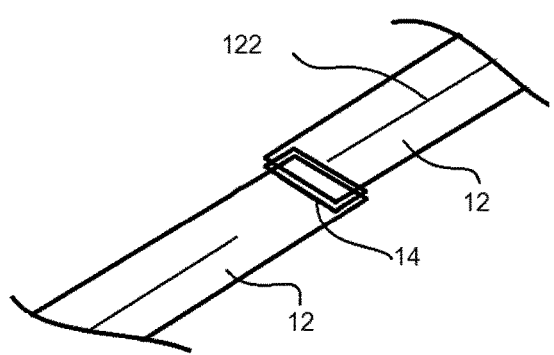

Oriented UHMWPE tape was produced according to the solid state powder process of EP1627719. The tapes of a thickness of 65 μm were slit along their orientation (drawing) direction to a width of 20 mm. 2 tapes of 20×200 mm$^2$ (12) and a rectangular piece of 10×20 mm$^2$ (14) were prepared (FIG. 1A) respecting the tape orientations (122) and (124) as depicted, for later assembly as shown in FIG. 1B. Assembly is such that the orientation direction (142) of the rectangular piece (14) is perpendicular to orientation direction (122) of the other 2 tapes (12). This difference of orientation direction is chosen, because perpendicular stacking is typical for armour and provides more critical adhesion values as compared to specimens with aligned orientations.

Test sampled were prepared by brush coating the future contact surfaces of the tape samples (12) and (14) with suspensions 1 to 3, substantially evaporating the water from the suspension under ambient conditions during 20 minutes followed by assembling the individual pieces according to FIG. 1b and pressing the contact area with a flat metal plate at 139° C. and a mass of 5 kg for 30 seconds. Two Comparative Experiments A and B were prepared in an identical way with Suspension 4 and no suspension respectively.

The obtained test samples tested at room temperature and at 70° C. and were clamped in a Zwick Z010 testing machine and loaded till fracture in the direction of the orientation direction of the tapes (122). The samples without suspension failed during the careful clamping operation and could not be tested.

| | Suspension | Fracture force [N] 23° C. | Fracture force [N] 70° C. |
|---|---|---|---|
| Example 1 | 1 | 98 | n.a. |
| Example 2 | 2 | 275 | 273 |
| Example 3 | 3 | 359 | 294 |
| Comp. Exp. A | 4 | 34 | 22 |
| Comp. Exp. B | n.a. | Not measurable | Not measurable |

The samples prepared with the polyolefin suspension show a substantially improved shear strength as compared to the test sample with the PUR or without suspension.

EXAMPLE 4

A fibrous armor sheet material was made by impregnating a unidirectional layer of Dyneema® 1760 SK76 fibers with a polyolefin suspension prepared by blending suspension 1 in a 1:1 ratio with water. After drying the aerial density of the unidirectional layer was 65 g/m$^2$ with a fiber to resin ratio of 82:18. Four such unidirectional layers were cross plied in a 0° 90° 0° 90° sequence and consolidated for 30 seconds at a pressure of 30 bar and a temperature of 115° C. The resulting cross plied sheet, bare of further protective films, had an areal density of 260 g/m$^2$. The sheets were very robust and allowed easy handling and stacking for producing hard ballistic armors, plates or helmets.

EXAMPLE 5

A stack of 28 sheets from Example 4 was made and pressed into a helmet shape in a deep draw mold with a gap of 7 mm. Pressing was performed during 30 minutes at 165 bar and 135° C. The pressure was maintained during cooling until the temperature was below 80° C. The helmets were trimmed to shape and subjected to shooting tests with 9 mm Parabellum bullets with a speed of 430 meters per second. The tests were performed with the NIJ Ballistic Penetration test Headform, Model 100_00_HNME according to N.I.J. 0106.01 standard for ballistic penetration tests using Herbin Sueu Plastiline clay. Two helmets were made and each helmet was subjected to four shots. The average depth of the four shots of each helmet was determined.

Comparative Experiment C:

2 further helmets were produced and tested according to examples 5 with the difference that Dyneema® HB26, available from DSM Dyneema, was used. HB26 has an areal density of 264 g/m$^2$, with a polyurethane matrix content of about 18 wt %.

The shooting trauma depth were measured in the clay. The results are presented in the table below for each helmet:

| | Trauma depth |
|---|---|
| Example 5' | 12.6 mm |
| Example 5" | 13.0 mm |
| Comp. Ex. C' | 14.8 mm |
| Comp. Ex. C" | 13.6 mm |

The trauma depths of the helmets of Example 5 are smaller than the ones of the comparative experiment C. The average observed reduction of about 1.4 mm trauma depth is a significant improvement for combat helmets.

EXAMPLE 6

The tapes of Examples 1 where cut to square pieces of 40×40 cm$^2$. The tapes were wetted by spraying them with about 40 ml/m² of suspension 1 diluted with water to a solid content of 4 wt %. 74 tapes were dried and stacked in an alternating 0° 90° sequence to a total areal density of 4.89 kg/m². The stacks were pressed during 45 minutes at a temperature of 120° C. and a pressure of 165 bar. The stacks were cooled under pressure until a temperature of 80° C. was reached and then removed from the press.

Comparative Experiment D:

Example 6 was repeated by stacking 75 tape without the diluted suspension 1, resulting in a compressed stack with an areal density of 4.89 kg/m². The compressed stacks of example 6 and Comparative Experiment D were subjected to shooting tests with 1.1 gram Fragment Simulating Projectiles. The speed of the projectiles was chosen such that a part of them perforated and a part of them were stopped, thus measuring in the range of the critical speed. The actual speed of the stopped projectiles was recorded and the width of the delaminated area of the corresponding stop locations was measured. The average stopping speeds and trauma width are presented in the table below:

|  |  | Example 6 | Comparative Experiment D |
|---|---|---|---|
| Average stopping speed | [m/sec] | 451 | 463 |
| Average trauma width | [mm] | 81.5 | 89.4 |
| trauma width/stopping speed | [msec] | 0.180 | 0.193 |

The difference in stopping speed was small and probably not of statistical significance. However, the difference in trauma width is significant. Even after normalizing against the stopping speed, the trauma in the panels according to the invention is smaller. Reduction in trauma width in armour plates is important in view of multi-hit performance since small trauma width reduces the chance of a second hit to arrive at a pre-damaged location. Coherence of the armour plates after being hit is better.

EXAMPLE 7

A Dyneema® fabric with an aerial density of 163 gram/m² was wetted with a polyolefin suspension 1. A black die was added to the suspension before applying it to the fabric. After drying, a robust water tight flexible sheet was obtained with good impregnation of the fibers. The fibre to polyolefin ratio of the sheet was 0.88 (47 wt % fibers). A cross-sectional inspection of the impregnated fabric confirmed that the dyed polyolefin suspension was present throughout the fabric and especially throughout the yarn bundles. Impregnating fabrics of orientated UHMWPE achieve good impregnation at high fiber content and thus good mechanical properties at low aerial density.

Comparative Experiment E

A flexible tarpaulin sheet made from the same Dyneema® fabric as used in Example 7, but employing a melt impregnation process method as described in WO201104321. The fibre to polyolefin ratio of the sheet was 0.37 (27 wt % fibers). A cross-sectional inspection of the impregnated fabric E showed substantial amount of voids and inhomogeneous impregnation of the fabric.

EXAMPLE 8

Flexible fibrous armor sheet material was made by impregnating a unidirectional layer of Dyneema® 1760 SK76 fibers with a 1:1 dilution of suspension 1 with water. After drying the aerial density of the unidirectional layer was 33 g/m² with a fiber to resin ratio of 82:18. The unidirectional layers were cross plied in a 0° 90° 0° 90° sequence, sandwiched between two low density polyethylene foils with a thickness of 7 micrometer and compression molded for 2 minutes at a pressure of 30 bar and a temperature of 115° C. Flexible sheet for soft ballistic applications with an areal density of 146 g/m² were obtained.

The flexible sheets were stacked to form a soft ballistic armour which was compared to similar ballistic armour but using commercially available Dyneema® SB21 armour sheets having a built up comparable to the ones according to the invention with the difference that the matrix is a non-crystalline styrenic rubber system (Comparative Experiment F).

The ballistic performance of the stacks build from the sheets of Example 8 and Comparative F proved to be equivalent. Nevertheless peel tests showed that the peeling strength of the sheets according to example 8 are substantially higher than those of SB21. Moreover, the inventive sheets of example 8 had lower scatter (standard deviation) of the peeling strength. That means that the risk of local low bonding and delamination is lower for the sheets according to the invention. Peel tests are performed by peeling upper and lower layers apart, such that the $2^{nd}$ and $3^{rd}$ layer are separated. The results of the peeling tests are below.

|  | Example 8 | SB21 (reference) |
|---|---|---|
| Average Peel strength [N] | 4.46 | 4.00 |
| Standard deviation [N] | 1.1 | 2.07 |

EXAMPLE 9

A fibrous armor sheet material was made by impregnating a unidirectional layer of Dyneema® 880 SK99 fibers with suspension 2. After drying the aerial density of the unidirectional layer was 33 g/m² with a fiber to resin ratio of 83:17. Two of such unidirectional layers were stacked in a 0° 90° sequence and laminated. Thus resulting in a cross ply laminate with an aerial density of 66 g/m². The sheets were reasonably robust and allowed easy handling and stacking for producing hard ballistic armor plates.

Armor plates were produced by stacking above cross plies in such a way that always 0° 90° sequences occurred. The stacks were made to a total aerial density of 14 kg/m² These stacks were pressed at 165 Bar, at a temperature of 135° C. during 30 minutes. Subsequently they were cooled under pressure to 80° C. before the press was opened. The obtained panels were cut to pieces of 0.2 m×0.2 m.

The specimens of 0.2 m×0.2 m were subjected to ballistic testing, by putting them in front of a hard steel plate with a thickness of 7 mm having a central hole with a diameter of 0.14 m. Subsequently. The specimens were shot with a Nato Ball DM111 (obtained from Metallwerk Elisenhütte GmbH, Article number 231007) projectile at a speed of 840 m/sec. All projectiles were stopped. The deformation of the specimens were measured using a high speed camera at the back side where the armor was allowed to deform through the hole in the steel plate. Additionally, the final displacement were measured after the tests.

Comparative Experiment F and G

The process of Example 9 was repeated with the sole difference that the unidirectional layers have been treated with two commercial coatings comprising as a resin PUR and SEBS for Comparative Experiment F and G respectively.

The results are summarized below. For example 9, and Comp Exp. G several specimen were tested and are reported separately. Beside the improved test results it was observed that the panels produced with sheets according to the invention showed no delamination of the unperforated sheets, whereas several panels of the comparative examples F and G delaminated and sheet edges were often pushed through the hole of the steel plate.

| Material | Dynamic displacement [mm] | Final displacement [mm] |
|---|---|---|
| Example 9 | 41 – 33 – 47-37 | 33 – 27 – 38-31 |
| Comp Experiment F | >100 | >100 |
| Comp Experiment G | 75 – 79 – 62- >100 | 62 – 73 – 55- >100 |

The invention claimed is:

1. A method for manufacturing a composite sheet comprising high performance polyethylene fibres and a polymeric resin comprising the steps of:
   a) providing high performance polyethylene (HPPE) fibres with a tenacity of at least 1.0 N/tex;
   b) assembling the HPPE fibres to form a sheet;
   c) applying an aqueous suspension of the polymeric resin to the HPPE fibres before, during or after assembling;
   d) at least partially drying the aqueous suspension of the polymeric resin applied in step c);
   to obtain a composite sheet upon completion of steps a), b), c) and d);
   e) optionally applying a temperature in the range from the melting temperature of the resin to 153° C. to the sheet of step c) before, during and/or after step d) to at least partially melt the polymeric resin; and
   f) optionally applying a pressure to the composite sheet before, during and/or after step e) to at least partially compact the composite sheet, wherein
   the polymeric resin comprises a functionalized polymer which is a copolymer of ethylene and/or propylene with an ethylenically unsaturated monomer comprising a carboxylic acid group or derivative thereof, and wherein
   the polymeric resin has a density as measured according to ISO1183 in the range from 860 to 930 kg/m$^3$, a peak melting temperature in the range from 40 to 140° C. and a heat of fusion of at least 5 J/g.

2. The method according to claim 1 wherein the HPPE fibres are selected from the list consisting of tapes, filaments and staple fibres.

3. The method of claim 1, wherein the HPPE fibres are prepared by a melt spinning process, a gel spinning process or solid state powder compaction process.

4. The method according to claim 1, wherein the concentration of polymeric resin in the aqueous suspension is between 4 and 60 wt %, wherein the weight percentage is the weight of polymeric resin in the total weight of aqueous suspension.

5. The method according to claim 1, wherein the HPPE fibres have a tenacity of at least 1.5 N/tex.

6. The method according to claim 1, wherein the HPPE fibres comprise ultra high molecular weight polyethylene (UHMWPE).

7. The method according to claim 1, wherein the amount of polymeric resin in the composite sheet is between 1 and 25 wt %, wherein the weight percentage is the weight of polymeric resin in the total weight of the composite sheet.

8. The method according to claim 1, wherein the ethylenically unsaturated monomer is selected from the group consisting of acrylic, methacrylic, cinnamic, crotonic, and maleic, fumaric, and itaconic reactants.

9. The method according to claim 1, wherein the peak melting temperature is in the range from 60 to 120° C.

10. The method according to claim 1, wherein the heat of fusion is at least 20 J/g.

11. The method according to claim 6, wherein the HPPE fibres comprise more than 95 wt. % of the UHMWPE.

12. The method of claim 7, wherein the amount of polymeric resin in the composite sheet is between 4 and 18 wt %.

13. The method according to claim 1, wherein the heat of fusion is at least 50 J/g.

* * * * *